United States Patent [19]

Auerbach et al.

[11] 3,872,251

[45] Mar. 18, 1975

[54] ELECTROCARDIOGRAPHY TRANSMITTER AND TRANSMISSION METHOD

[75] Inventors: Albert A. Auerbach, New York, N.Y.; George M. Katz, Leonia, N.J.; Sidney Steinberg, Bronx, N.Y.

[73] Assignee: Medalert Corporation, New York, N.Y.

[22] Filed: Feb. 20, 1973

[21] Appl. No.: 334,078

[52] U.S. Cl. .......... 179/2 A, 340/177 CA, 340/180, 340/207 R, 128/2.06 B, 128/2.06 P

[51] Int. Cl. .......... H04m 11/00

[58] Field of Search ....... 128/2.06 R, 2.06 B, 2.1 A; 179/2 R, 2 DP, 2 A, 3, 4; 340/177 CA, 180, 207 R

[56] References Cited

UNITED STATES PATENTS

| | | | |
|---|---|---|---|
| 3,374,485 | 3/1968 | Gemmer | 128/2.06 B |
| 3,426,150 | 2/1969 | Tygart | 179/2 DP |
| 3,426,151 | 2/1969 | Tygart | 179/2 DP |
| 3,477,421 | 11/1969 | Partridge | 128/2.06 B |
| 3,517,662 | 6/1970 | Finch | 128/2.06 B |
| 3,565,058 | 2/1971 | Mansfield | 128/2.06 R |
| 3,721,230 | 3/1973 | Ziernicki | 128/2.06 R |

*Primary Examiner*—William C. Cooper
*Assistant Examiner*—Gerald L. Brigance
*Attorney, Agent, or Firm*—Yuter & Rosen

[57] ABSTRACT

Described is a portable, battery-operated electrocardiography (EKG) transmitter, and method of transmission, from the patient's location via telephone lines to a diagnostic central. The transmitter, which includes a "calibration"-signal generator for producing a reference signal, an EKG-signal amplifier and a frequency-modulator, operates at a nominal carrier frequency of 1800 HZ. Each (periodic or emergency) transmission commences with a sequence of calibrate-signal square waves at about 5 Hz for about 5 seconds. The calibrate signals modulate the 1800 Hz carrier to produce a 225 Hz deviation and deflect the EKG recording pen at the diagnostic central by 1 cm. The diagnostic central maintains a fixed sensitivity of 1 cm deflection per 225 Hz=Δf as a reference signal for all patients. At the end of the 5 second interval, the calibration signal generation terminates automatically, and then the amplified EKG-signals are switched to modulate the carrier. The reference signal, as pen-recorded preceding and juxtaposed to the recorded EKG-signals proper, serves to provide: (1) a convenient visual reference and an accurate calibration marker for the EKG-signal amplitudes, to indicate changes in EKG signals relative to previous transmissions; (2) a basis for discrimination between changes attributable to physiological changes in the patient and changes attributable to aging and drift of transmitter components; (3) a forecast of failure of a patient's pacemaker; (4) early warning of the approach of end of the battery life. However, long battery and low drift are assured by automatic shut-off of the transmitter after operational use thereof for about 90 seconds maximum, and by selection of stable components.

13 Claims, 9 Drawing Figures

ELECTROCARDIOGRAPHY TRANSMITTER AND TRANSMISSION METHOD

This invention relates to an electrocardiography (EKG) signal transmitter and method, and more particularly t a transmitter which may be used for transmission from a patient's location via telephone lines to a central diagnostic office. In this specification, the terms "central", "central office" and "central diagnostic office" are used interchangeably; the terms are not limited to a "central" in the usual telephony sense, but are applicable also to a hospital, a clinic, or even a single cardiologist's office or a general practitioner's office, provided required equipment is present at that location.

The transmitter of the present invention is specially suited for use in the EKG signal transmission-reception arrangement described in the co-pending application of Dr. Albert A. Auerbach, Ser. No. 257,557, filed on May 30, 1972, which will hereinafter be referred to as the "transmitter-receiver", or the "transmitter-receiver-application". However, the transmitter of the present invention is not restricted in its use to the "transmitter-receiver" but may be used in other EKG transmit-receive arrangements. While some familiarity with the transmitter-receiver-application is desirable, such familiarity is not absolutely essential, since those of its operating features essential for the present invention are briefly restated here.

The EKG transmitter of the present invention and also the "transmitter-receiver", contemplate the following mode of operation. EKG signals produced by the patient at the patient's location, for example, at the patient's own home and even without the attendance of any other person at the patient's home, are amplified in the transmitter; the amplified signals are modulated onto a frequency-modulator which is contained within the transmitter and which operates at a nominal carrier frequency of 1,800 Hz. For purposes of this specification, frequency modulation and phase modulation shall be considered synonymous.

Throughout this specification and also in the drawings those specific numeric values (e.g. 1,800 Hz.) will be given for which a working embodiment of the invention was designed and operated successfully. However, it should be understood that these numeric values are given by way of example only, since the invention can be practiced with other design constants. Further in regard to numeric values, it should be borne in mind that tolerances of ± 10 percent are usually acceptable and the hereinafter disclosed system was designed with such a tolerance margin; however, even tighter tolerances can be readily achieved.

Resuming the brief description of the transmission scheme of the present invention in association with the "transmitter-receiver" system, the modulated carrier drives a loudspeaker which is acoustically coupled to the mouthpiece of the telephone set at the patient's location for telephone transmission to the diagnostic central. At the central, the carrier signal is demodulated, and the original EKG signal is thus recovered and is used to operate the EKG pen-recorder in the usual manner. At the central, a precise standardization of recording pen deflection is fixed and maintained uniformly for all patients. For the specific system herein contemplated the standardized pen deflection sensitivity is one centimeter per 225 Hz of deviation from the carrier frequency of 1,800 Hz (1 cm/$\Delta f$=225 Hz), and the calibration signal of the transmitter is set to produce the same 225 Hz of deviation from the carrier frequency of the signal transmitted to the central receiving system. Thus, if the transmitter and its battery are working properly, the transmitted calibration signal always produces a 1 centimeter pen deflection at the central receiving system. A pen deflection for the calibration signal of less than 1 centimeter will indicate a weak battery or a transmitter fault.

It is therefore an object of the present invention to provide an EKG transmitter which is to transmit to a diagnostic central which central services the transmitters of a sizable number of patients, all these transmitters to function in harmony with the central's standardization requirements.

As stated above, the receiving standardization at the central is 1 cm/225 Hz = $\Delta f$. As required for individual patients, full adjustments of a gain control on the transmitter can be made to amplify an EKG signal with a small QRS complex or reduce an EKG signal with a large pacemaker artifact. When this procedure is indicated, gains are usually increased by a factor of two, or reduced by a factor of two.

For convenience throughout the description, it is assumed that where the EKG is taken in Mode I (only the left-arm and right-arm electrodes are active) the largest excursion or the largest peak results from the positive R part of the QRS complex, in contrast to the partly negative peaks resulting from the Q and S portions of the QRS-complex (as is evident from FIG. 4). In regard to the QRS-complex, of the several signals or waveshapes obtained by EKG methods, which waveshapes are known as "complexes", "segments" and "waves", the QRS-complex is the single one which by itself is usually most prominant.

The EKG-amplifier gain is preferably preset to the patient so as to produce at the central recording pen deflection for the R-peaks of about 2 cm, and the gain setting is not further disturbed thereafter. However, the preset gain setting is not critical as long as the resulting signal at the central is large enough to activate the receiving system and properly record the EKG signal, or is not too large so as to overload the receiving system. In subsequent periodic EKG transmissions, comparisons are made of the amplitudes of the R-peaks in the electrocardiograms made then and previously for the particular patient, and deviations from the previous deflections with respect to the standardization or reference signal indicate changes in the patient's heart condition. Thus, a short term increase in the pen deflection will be a sign of hypertension. A long term gradual change in the amount of pen deflection will be a sign of weight change. Of even greater significance for pacemaker patients, a reduction in the amplitude of the recorded pacemaker signal (the artifact) would forecast the failure of the patient's pacemaker so that the pacemaker can be replaced before putting the patient in danger of heart failure due to improper operation of his pacemaker.

Thus, the general object of the invention is to extend and save the lives of people with heart trouble.

The transmitting apparatus of the present invention is designed to be quickly attachable at any location equipped with a telephone, for so long as the transmission is required, and is further designed to be thereafter removed just as quickly and without the need at the transmitter or the telephone of permanent or expensive coupling devices. Consonant with such requirement for complete portability, the transmitter of the present invention is battery powered; the batteries are selected to have long life and the circuitry of the transmitter imposes relatively low drain on the batteries and for only short periods at a time. To assure long-term stability of the transmitter, and very low long-term drift, the transmitter incorporates voltage regulation devices; the amplifier is provided with degenerative feedback circuits, and other measures are taken —described in detail hereinafter —to insure long-term stability of the transmitter's basic system calibration in conformity with the standardization requirements noted above and long-term reliable operation.

The battery, the voltage regulator and the modulator might be said to be less stable than the remainder of the transmitter. Batteries, even of highest quality, have a finite life even when, as per the present invention, the time intervals of battery drain are reduced to a minimum. Long before the battery fails totally, its output voltage drops; when the drop is suficiently large, the voltage regulator can no longer regulate to very close limits. The modulator responds to direct-current ("Zero Hz") changes, such as changes in regulated supply voltage, in two ways:

1. by change in the carrier frequency —unless the change is quite radical, say 20 percent or higher, it is of little consequence, since the equipment at the diagnostic central is essentially insensitive to direct-current changes;
2. by change in the deviation sensitivity — this is perceptible at the central.

It is an object of the invention to provide a system which affords discrimination between changes attributable to physiological changes in the patient and changes attributable to changes, gross or fine, in components or subsystems of the transmitter.

To afford possibility of discrimination between changes attributable to physiological changes in the patient and changes attributable to drift or deterioration within the transmitter, the following system is used, in accordance with the invention. As part of a complete transmission from the patient's transmitter, and before transmission of the EKG signals proper, the modulator of the transmitter is subjected for about 5 seconds to modulation by a "calibration" square wave train having a peak amplitude of 1 volt and a 5 Hz repetition rate. The pen deflection at the central will accordingly be in the form of a similar square wave, with 1 cm peaks. The calibration or reference signal, as pen-recorded preceding and juxtaposed to the recorded EKG signals proper, serves to provide a convenient visual reference and even an accurate calibration marker, for the EKG-signal amplitudes to indicate changes in them relative to a previous transmission. The convenient visual reference is highly desirable, (as is evident from FIG. 4) owing to the rather long time (about six QRS-complexes in FIG. 4) for settlement to the steady state conditions of (1) more or less repetitive QRS-complexes and (2) constant "average" or "quiescent"-value about which the QRS-complexes swing.

An advantage of the invention is that the central receiving system can distinguish from 1800 Hz components in a Voice transmission preceding the EKG transmission and the EKG transmission itself. The recording pen is only activated by the received signals in the presence of both the carrier and the calibration signal. Moreover, the calibration signal is employed at the central receiver to prepare the system to record the EKG signal.

When in the later life of the transmitter, the voltage regulator cannot regulate within as close limits as initially, the calibration signal peaks will be lower and the pen-deflection peaks less than 1 cm. Under these circumstances, the calibration signal serves additionally to afford the above-noted kind of discrimination between physiological changes in the patient and changes attributable to the transmitter, to provide a measure of correction for these changes, and as an early warning of battery deterioration or other deterioration within the transmitter.

As previously indicated, the transmitter of the present invention is intended to be used even by the patient himself, even without supervision of his doctor or of anyone else, even from his own home, or wherever he may be located, either under emergency conditions or as part of a periodic electrocardiography program. Making due allowance for the possible advanced age of a patient and possible feebleness of mind or body, the transmitter of the present invention is designed to shut itself off automatically. This obviates the need for concern that the patient might forget or neglect either to terminate transmission of the calibration square wave or of the EKG signals themselves. In this way, the previous battery life is not prematurely terminated. This is just one of the several human engineering features of the invention; others will be described in the following more detailed description together with further objects and still other features of the invention.

The matters discussed in the preceding specification introduction, and even in the preceding Abstract, are important not only for introductory purposes but also for purposes of the more detailed description in which they will not necessarily be repeated. The specification — which is to be deemed to embrace also the preceding Abstract and preceding introduction, and the appended claims — should thus be considered in its entirety. In the accompanying drawings:

FIG. 1 is a perspective view illustrating the exterior of a transmitter in accordance with a preferred embodiment of the invention;

FIGS. 2A to 2F considered as a unit (and in this sense equivalent to a single "FIG. 2"), constitute both a block diagram and a schematic drawing of the transmitter, including its calibrate generator, essentially as used under operational conditions in a working embodiment of the invention; more particularly;

Figure 4:
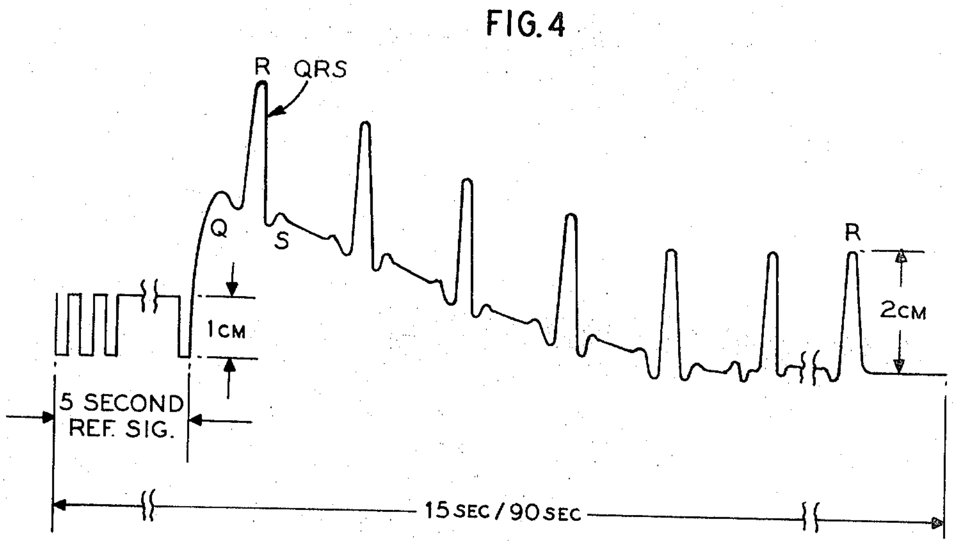
Figure 2A:
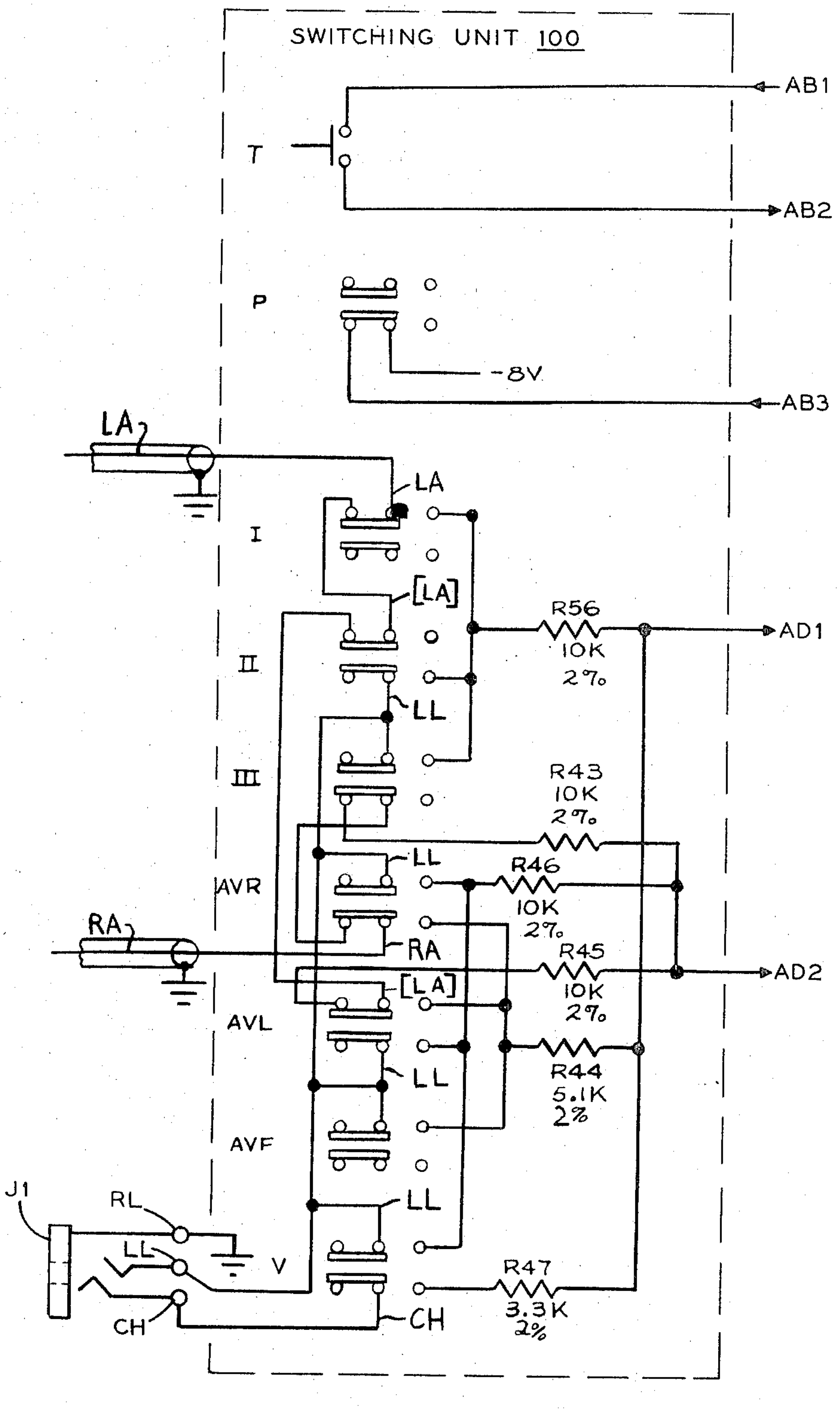
FIG. 2A is a schematic diagram of the Switching Unit 100 of the transmitter.
Figure 2B:
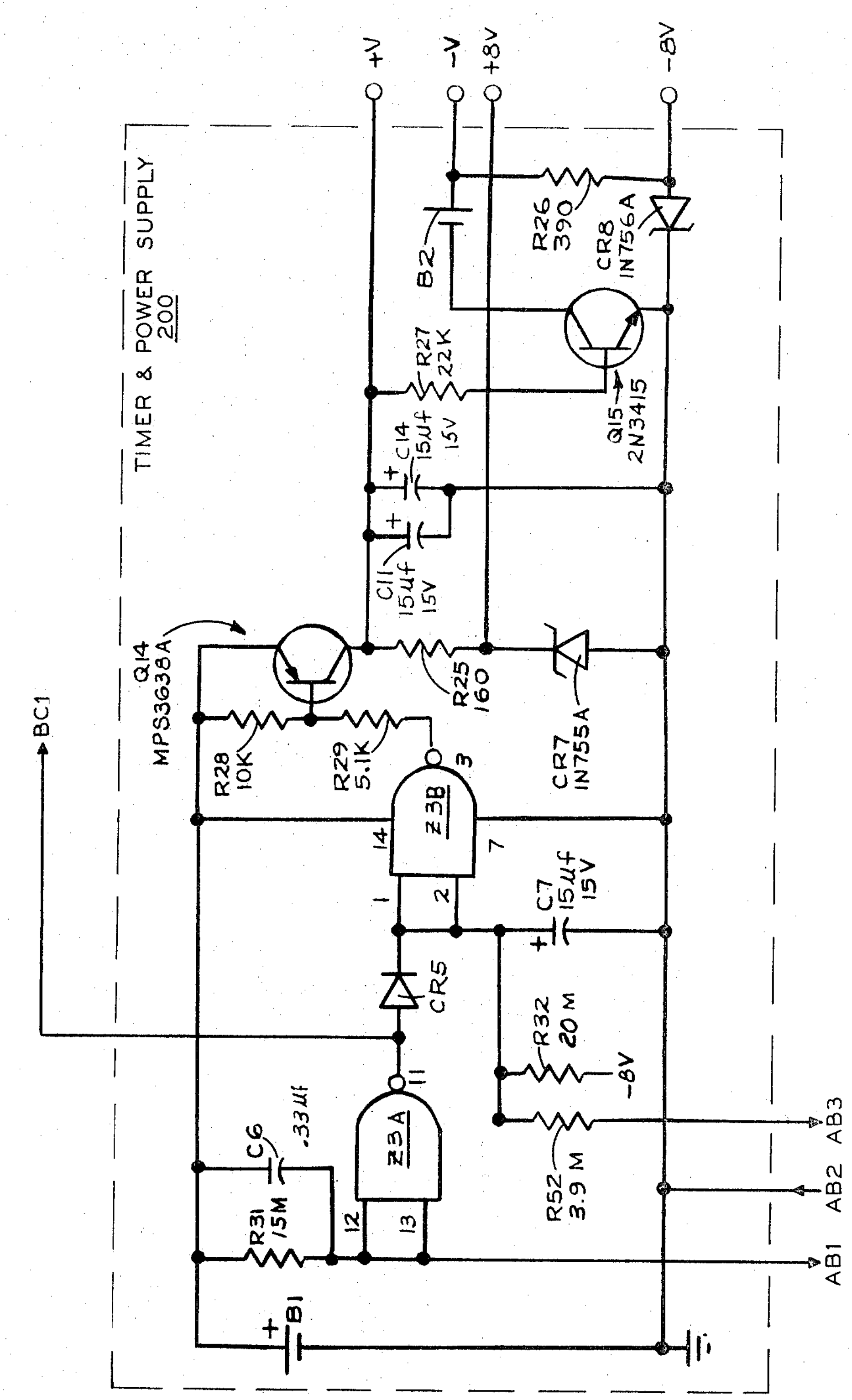
FIG. 2B is a schematic diagram of the Timer and Power Supply 200 of the transmitter.
Figures 2C, 2E, 3:
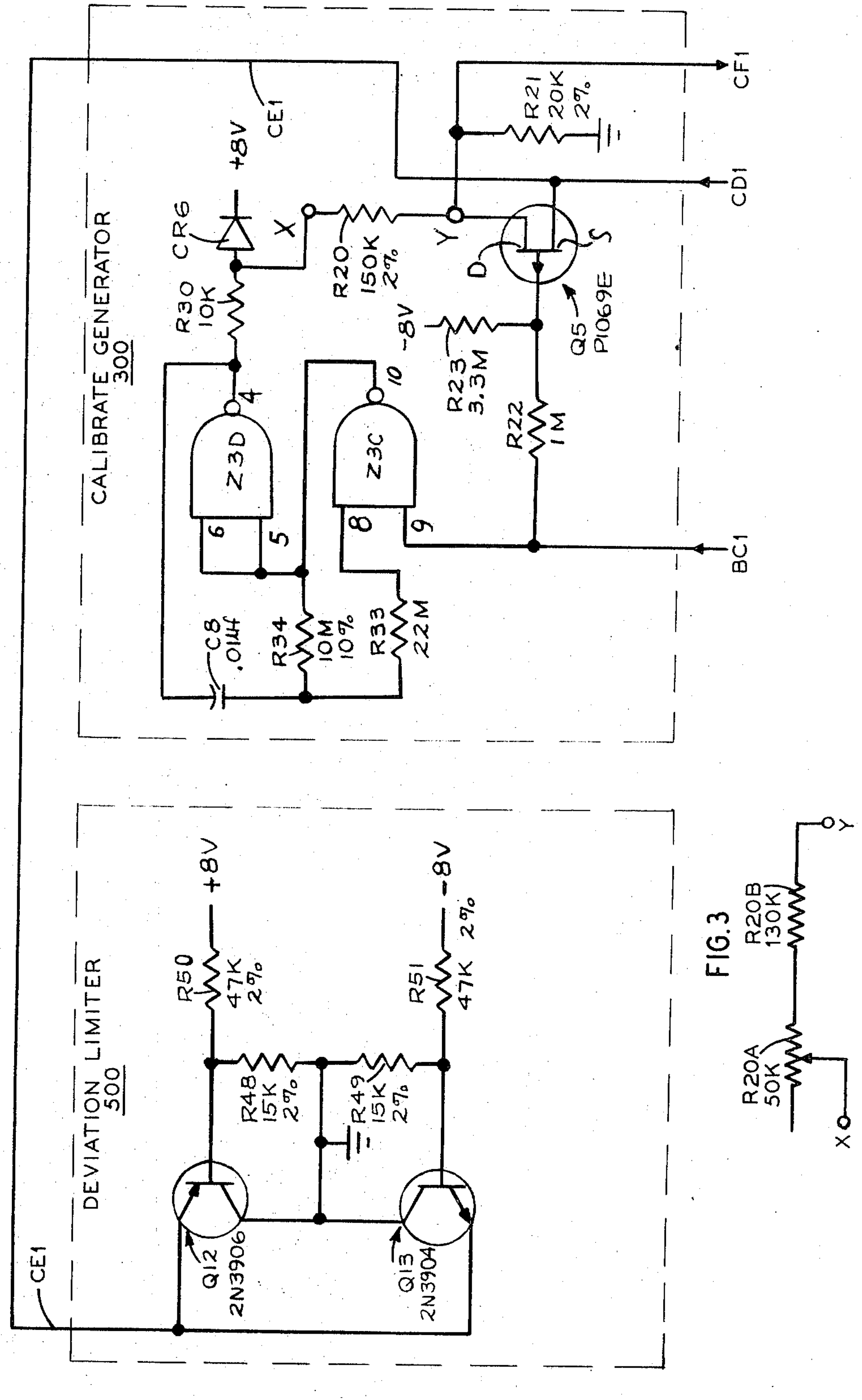
FIG. 2C is a schematic diagram of the Calibrate Generator 300 of the transmitter.
FIG. 2E is a schematic drawing of the Deviation Limiter 500 of the transmitter.

FIG. 3 is a schematic illustration of modification circuitry to be inserted between the terminals X and Y in the Calibrate Generator 300 of FIG. 2C; and FIG. 4 is a composite of calibration (reference) signal plus electrocardiogram (EKG) signal as obtained at the diagnostic central in response to the signal emanating from the transmitter of FIG. 2;* FIG. 4 is deliberately somewhat exaggerated in the interest of clarity. FIG. 4 further serves as a timing diagram indicative of the sequence of events occurring in the transmitter of FIG. 2.

* FIG. 2 being considered as a composite of FIGS. 2A to 2F, as stated above.

In FIG. 2 are shown not only the individual circuit components of the transmitter, but also their values and even the tolerances of these values. Therefore, it is deemed unnecessary to list in the description each and every component and the manner in which it is connected to some other component, since this is evident from the drawing. Those components and their connections which are of special importance will be discussed in the written description, and the operation and cooperation of the several blocks of FIG. 2 will be discussed thoroughly. In FIG. 2, for resistors for which no tolerance is indicated, it may be assumed that these are 5 percent, ¼ watt; for capacitors, the tolerance is 10 percent. Diodes not specifically identified as to type, are of the type 1N4148.

Figure 2D:
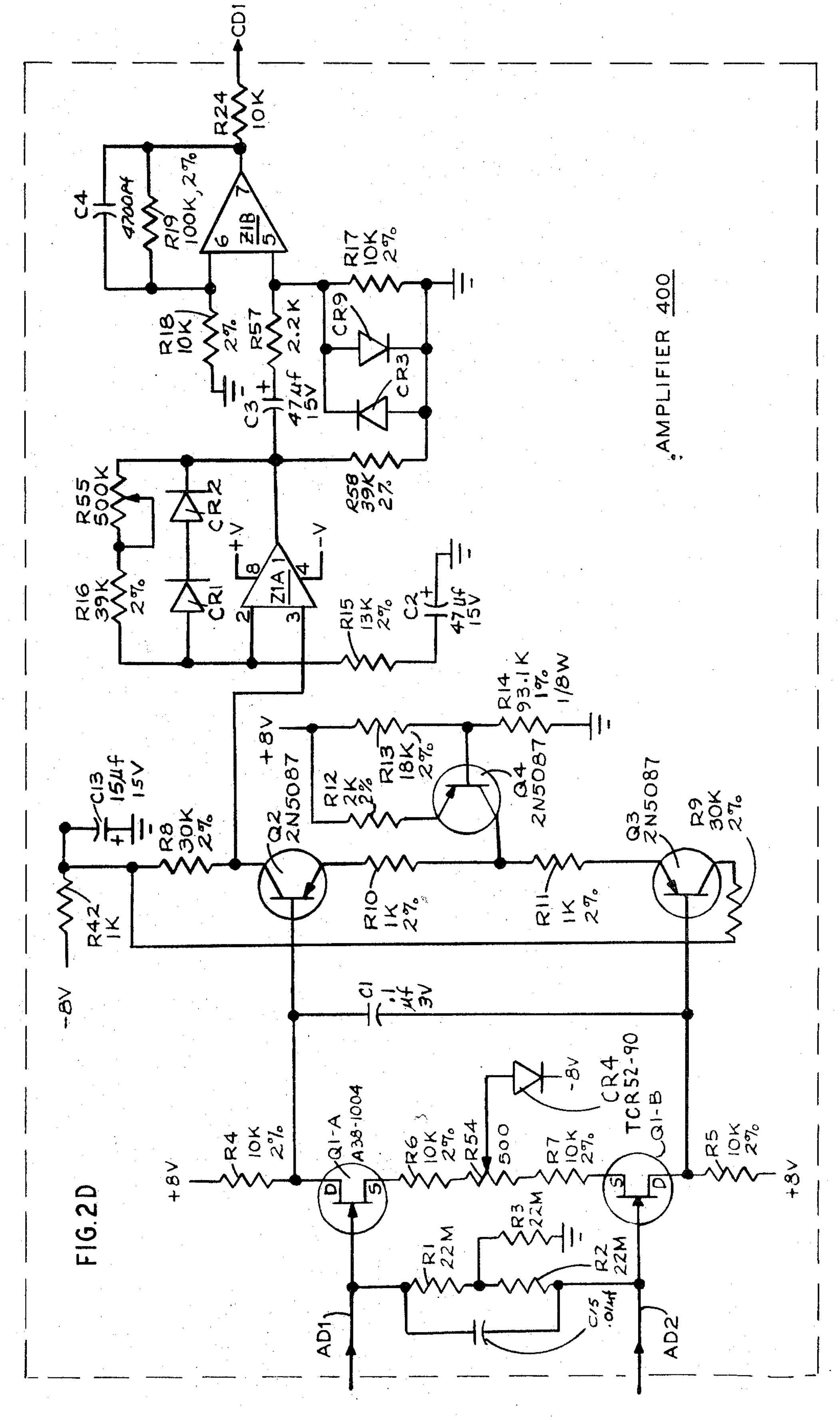
FIG. 2D is a schematic drawing of the Amplifier 400 of the transmitter.

Reference is made here to rheostat-connected potentiometer R55 contained in the block 400 in FIG. 2D (upper right center), which is the gain control for the EKG Amplifier 400 of the transmitter. Typical for the following description, the recital "the potentiometer 400R55" shall mean "the potentiometer R55 contained in the block 400". Where it is clear from the context that the description is confined to the block 400, the recital might simply be "the potentiometer R55". The potentiometer 400R55, the gain control, is preferably preset to produce, initially at least, about a 2 cm peak for the R wave in the electrocardiogram as recorded at the diagnostic central (see FIG. 4).

Referring to both FIGS. 2A and 2D, shown there are interconnecting lines AD1, AD2, implying interconnections 1, 2, between FIGS. 2A and 2D. This convention is used throughout "FIG. 2".

Figure 1:
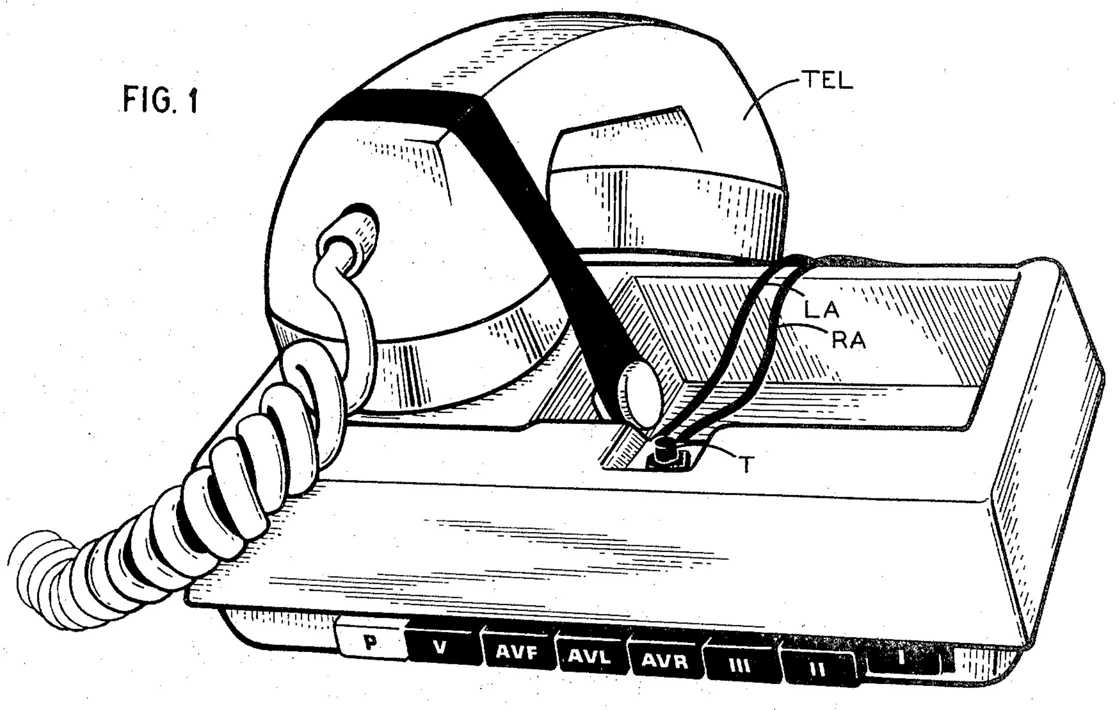

FIG. 1 illustrates the exterior of the transmitter, and also presents an exterior view of the Mode-selecting push buttons I, II, III, AVR, AVL, AVF and V, which are also indicated in the Switching Unit 100 in FIG. 2A. These seven Modes or "Lead Configurations" are in accord with standard electrocardiography terminology; a review of these "Modes" is presented in an Appendix at the end of the written description. The transmitter of the invention thus affords the possibility for transmitting a complete electrocardiogram utilizing all five electrodes; namely, the left arm electrode, the right arm electrode, the left leg electrode, the right leg electrode (also known as the indifferent or ground electrode) and the chest electrode (also known as the precordial electrode). In FIGS. 1 and 2A, the electrodes themselves are not illustrated, but the leads outgoing to these electrodes or the connector pins connected to them, are respectively designated (FIG. 2A) as LA, RA, LL, RL, and CH. In "FIG. 2," there is employed another convention, mnemonically useful, of designating by one and the same reference character all points, or leads, or connections, or terminals, which carry the same potential; note the repeated usage of LA in the Switching Unit 100 of FIG. 2A.

The push-buttons I, II, etc. select the mode of operation. To select Mode I, for example, the push-button I is pushed "in" as actually illustrated in FIG. 1. The operator may thereafter remove his finger, and yet push-button I will remain in. The push-buttons I, II, etc. (but not the push-button P) are interlocked; pushing in any one of these buttons will produce the result, that any then already pushed-in button is pushed out again. These push-buttons and also push-button P (FIGS. 1 and 2A) are essentially double-pole, double-throw switches. Push-button P is not interlocked with the others but is of the "push-push" type. To restore the push-button P to is "out" position, the operator should once more push the same button P.

The push-button P performs a function peculiar to the present invention, namely, selecting a transmission time of 15 seconds (P in) or 90 seconds (P out), both transmission times also including transmission of the calibration (reference) signal (see FIG. 4). As used hereinafter, "transmission" shall mean transmission of the composite of the calibration signal and the EKG signal proper (15 seconds or 90 seconds) as illustrated in FIG. 4, unless otherwise clear from the context.

Figure 2F:
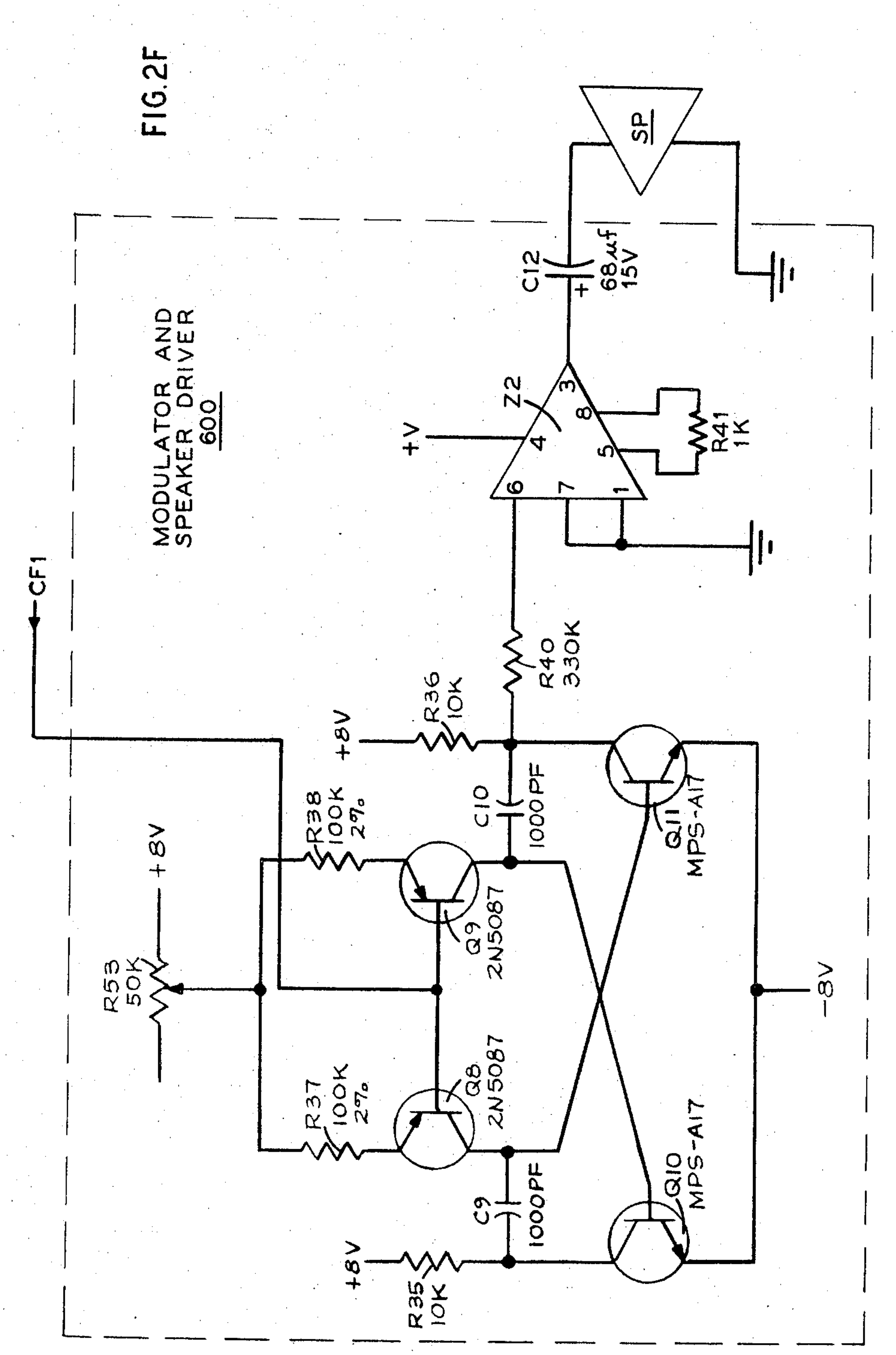
FIG. 2F is a schematic drawing of the Modulator and Speaker Driver 600 of the transmitter.

In FIG. 1 is also shown the Telephone Set TEL at the patient's location, strapped to the transmitter casing so that the receiver's mouthpiece lies directly over a loudspeaker which is not visible in FIG. 1, but appears as 600SP in FIG. 2F(extreme right). The loudspeaker 600SP may be of the type designated as Quam Company 22A06Z100 with an impedance of 100 Ohms.

FIG. 1 further shows the outgoing leads LA and RA mentioned above. These two leads are the only leads necessary for operation n Mode I which Mode produces the QRS complex (see FIG. 4); indeed for many patients transmission in Mode I is all that is necessary, at least on a periodic routine basis, for which the patient may be relied on to effect the transmission all by himself; that is, without supervision. To minimize any possible errors by such patients, as is shown in FIG. 1, the push-buttons I and P are placed at opposite ends of the row of push-buttons, and are given contrasting colors. This reduces the possibility of erroneous actuation of the buttons II, III. . . V. However, should such a patient still not be trusted completely, a snap-over cover may be placed over the buttons II, III . . . V so as to preclude any possibility of their actuation. To go one step further in prevention of erroneous pushing of buttons, where it may be assumed that the patient will consistently effect transmission for the same length of time (15 seconds or 90 seconds), the push-button P may be placed in the appropriate position, in or out, and the push-button I may be pushed in, and then the snap-over cover is placed over the entire set of buttons, I, II. . . P. The patient would then be called on merely to push the button T to initiate transmission. The immediately following description of "FIG. 2" will concern itself only with Mode I operation; the other Modes are presented in the Appendix.

Referring to FIGS. 2A–2F, the transmitter is composed of the following functional blocks or functional units: Switching Unit 100, Timer and Power Supply 200, Calibrate Generator 300, EKG Amplifier 400, Deviation Limiter 500, and Modulator and Speaker Driver 600. On the right side of the block 200 (FIG. 2B) are shown four output terminals designated +V, −V, +8V, and −8V. These terminals will be rendered "live" upon initiation of a transmission by operation of the push-button T to provide power supply voltages for the transmitter in general. These voltages, as well as voltages in general hereinafter, are with reference to the "chassis" ground of the transmitter, unless otherwise specified or clear from the context. It is presently assumed, however, that the push-button T has not as yet been operated, so that these four terminals are not as yet live, but are in fact "dead" so that essentially no power is supplied as yet to the transmitter, with the following slight exception.

The ultimate sources for the four power supply voltages, just mentioned, are two batteries 200B1 and 200B2 (FIG. 2B). Both these batteries are selected to have both long "shelf" life and operating life; in the working embodiment of the invention the battery B1 is Mallory Company type TR431 (nominal no-load output voltage +12 volts), and the battery B2 is Mallory Company type TR118 (nominal no-load output voltage −11.2 volts). Even before initiation of a transmission, by operation of the push-button T, the full voltage of the battery B1 is applied across pins 14 and 7 of a logic unit 200Z3B. The logic unit Z3B is one section of a four-section integrated circuit logic package Z3, which in the working embodiment of the invention is Radio Corporation of America type ZB406AE. Each of the four sections 200Z3A, 200Z3B (FIG. 2B), 300Z3C, 300Z3D (FIG. 2C) consists of complementary symmetry metal-oxide-silicon transistors; each section, when activated, functions as a two-state device which is either "on" or "off". Under the presently assumed condition of inactivity of the transmitter, all four sections of unit Z3 are off; the battery B1 via pins 14 and 7 of Z3B provides the proper bias-potential currents, and no more than just these currents, to insure off-condition for all four sections. Thus, the full voltage of the battery B1 is a fifth power supply for the transmitter proper, that is aside from the Unit 200 (FIG. 2B).

Prior to the initiation of the transmission, the capacitors throughout the transmitter will be in uncharged condition; two such uncharged capacitors are capacitors 200C6 and 200C7 (FIG. 2B). The former cooperates with a resistor 200R31 —note their respective values —to establish the 5 second duration of calibration signal generation. The capacitor 200C7 whose both "plates" are presently at ground potential, cooperates with the resistor 200R52, or with the resistor 200R32, to establish the 15 second or 90 second transmission time. Still considering the conditions before initiation of the transmission, the transistors and diodes shown in "FIG. 2" are as yet non-conducting.

Before initiating the transmission, the patient will have attached to his body the electrodes; for example, solely the left arm and right arm electrodes for purposes of Mode I operation. These two electrodes have the respective leads LA and RA permanently attached to them; the latter two leads are also permanently connected into the transmitter as shown in FIG. 2A. He will have placed the push-buttons I and P into their proper operating positions (although he may do this at a later time), or alternatively, these two push-buttons will have been permanently prepushed in for him in the manner previously mentioned. The patient will then establish voice communication with the diagnostic central, utlizing his telephone set TEL (FIG. 1); he may receive "last reminder check-list instructions" from the central, including specifically proper push-button operation. When complete readiness is acknowledged by the patient and by the diagnostic central, the patient will strap his telephone set in the position shown in FIG. 1 for acoustic coupling with the loudspeaker 600SP, and he will thereafter depress the push-button T (FIGS. 1 and 2A).

While the push-button T is (momentarily) in the depressed position, the pins 12 and 13 of logic unit 200Z3A (FIG. 2B) are grounded via line AB1, push-button T, and line AB2, and in consequence the unit Z3A (FIG. 2B) is turned on; furthermore, the lower "plate" of the capacitor 200C6 is also grounded through the virtual short circuit presented by the push-button, so that this capacitor virtually instantly charges to the full voltage of the battery 200B1. When the push-button T is released, the upper plate of the capacitor C6 (FIG. 2B) will remain at the full potential of the battery B1, and its lower plate will remain temporarily at ground potential, since the voltage across a capacitor cannot change instantly. Thus, the pins 12 and 13 of logic unit 200Z3A will remain at ground potential, or thereabouts, and the logic unit Z3A will remain non. Thereafter, the capacitor C6 will discharge through the resistor 200R31; noting the values of capacitor C6 and resistor R31, the time for discharge is about 5 seconds. This implies that the logic unit Z3A section will be on for 5 seconds, and noting the connection from pin 11 of the logic unit Z3A via line BC1 to pin 9 of logic unit 300Z3C (FIG. 2C) the Calibrate Generator 300 (FIG. 2C) will operate for the 5 seconds (see also FIG. 4); more on the Calibrate Generator 300 later.

With pin 11 of logic unit 200Z3A (FIG. 2B) on or positive, the positive transient is transmitted via isolation diode 200CR5 to pins 1 and 2 of logic unit section 200Z3B, and it too is now turned on. In consequence, and by the action of the resistors 200R28 and 200R29, a voltage regulator transistor 200Q14 is caused to conduct via resistor 200R25 and Zener diode 200CR7. The power supply terminals V and +8V now become live. The +8V voltage is rather well regulated by the action of the Zener diode CR7. The voltage +V is relatively speaking unregulated, but may be considered to be about +9 to +10 volts. The paralleled capacitors 200C11 and 200C14 serve as power supply filter capacitors in relation to the +V voltage.

With the voltage +V now "live" or on, another voltage regulating transistor 200Q15 is rendered conductive, its base being now energized by the voltage +V via resistor 200R27. In consequence, a complete circuit path is provided for the battery 200B2, namely through the transistor 200Q15, and another Zener diode 200CR8, and resistor 200R26. In consequence, the terminals −V and −8V now also become live; the −8V voltage is well regulated by the action of the Zener diode CR8, whereas the −V voltage is relatively unregulated, but may be considered to be −9 to −10 volts. Thus the four power supply terminals on the right side of the block 200 are now all live, and the four supply voltages are now applied throughout the transmitter illustrated in "FIG. 2."

Aside from the on-condition of the logic unit 200Z3A (FIG. 2B) and aside also from the operational condition of the Calibrate Generator 300 (FIG. 2C), which both only last for about 5 seconds, the circuit conditions in the Timer and Power Supply 200 (FIG. 2B) resulting from the momentary closure of the push-button T, as just described, last longer, and in fact last for the full period of transmission of either 15 seconds or 90 seconds, for the following reasons. Initially, the pins 1 and 2 of the logic unit 200Z3B (FIG. 2B) and also the upper plate of the capacitor 200C7, had been at essentially ground potential. Thereafter, when the logic unit 200Z3A turned on, the pins 1 and 2 of unit Z3B went at least transiently positive, and this was sufficient to turn on the unit Z3B as well. The unit Z3B behaves in such a way that once it is turned on, it remains on unless the pins 1 and 2 attain a "transfer" potential of about −2.5 volts, or attain an even more negative potential. Thus the unit Z3B behaves like a trigger circuit. The transfer potential is attained in 15 seconds or 90 seconds by the charging of the capacitor 200C7 either through the resistor 200R52—note that it is connected via line AB3 through the push-button P (FIG. 2A) (in "left" or "out" position) to the −8V voltage —or through the resistor 200R32 (FIG. 2B), also connected to the −8V voltage. More accurately, with push-button P out, charging is through the parallel combination of resistors R32 and R52 (FIG. 2B), but note their values. Should the patient inadvertently have reversed the order of pressing of the push-buttons, namely first the transmit button T and thereafter the transmission time selection push-button P (from its "out" position to its "in" position), there would result a transmission lasting somewhere between 15 seconds and 90 seconds. Furthermore, the patient is afforded the liberty of even pushing in the push-button I late; he may do this during the initial 5 second interval, without any perceptible effect. At the end of the 15 second or 90 second transmission, the transmitter thus shuts itself off to its initial, stand-by condition; this obviates the necessity for depending upon the perhaps forgetful patient to do this.

Considering next the action of the Calibrate Generator 300 (FIG. 2C), it is initially turned on when pin 11 of unit 200Z3A (FIG. 2B) goes "on" or "positive"; the Calibrate Generator 300 (FIG. 2C) will turn off once more at the end of the 5 second interval when the pin 11 (FIG. 2B) is once more off. The voltage of the pin 11 (FIG. 2B) is transmitted to pin 9 of unit 300Z3C (FIG. 2C), and also to the thereto connected resistor 300R22. As applied to the pin 9 (FIG. 2C) the positive input voltage from pin 11 of Z3A (FIG. 2B) triggers off a free-running multivibrator action of the logic units 300Z3C and 300Z3D (FIG. 2C). The repetition rate of the multivibrator is determined primarily by the values of resistor 300R34 and capacitor 300C8, and secondarily by the value of resistor 300R35. The repetition rate is about 5 Hz, and the wave shape is essentially a square wave.

By virtue of the multivibrator action, pin 4 of logic unit 300Z3D (FIG. 2C) will swing between 0 volts and the full voltage of the battery 200B1 (FIG. 2B), about +12 volts. Pin 4 (FIG. 2C) is coupled to a terminal X via resistor 300R30; at the terminal X, the voltage swing is reduced to from 0 volts to +8.6 volts by the action of clamping diode 300CR6 which is of the type designated as 1N4148 and as such has a forward voltage drop of 0.6 volts. The voltage swing is further attenuated at the terminal Y by the voltage divider action of resistors 300R20 and 300R21, their junction being coupled to the terminal Y and also via line CF1 to the Modulator and Speaker Driver 600 (FIG. 2F). At the terminal Y (FIG. 2C) and therefore at the input to the modulator unit 600 (FIG. 2F) the swing is in fact that one used for the calibrating voltage, namely from 0 volts to +1 volt (see FIG. 4).

Within the block 300 (FIG. 2C) is also shown a field effect transistor 300Q5; its gate electrode is designated by arrow, its source electrode by S and its drain electrode by D; this symbology also applies to field effect transistors 400Q1A and 400Q1B (FIG. 2D). The field effect transistor 300Q5 (FIG. 2C) functions as an electronic switch the purpose of which is to block the transmission to the modulator unit 600 (via line CF1) of EKG signals during the 5 second interval of calibration signal generation, and thereafter to permit such transmission. This is accomplished in the following manner. With pin 11 of unit 200Z3A (FIG. 2C) going positive (note line BC1), resistors 300R22 and 300R23 (FIG. 2D), acting as a voltage divider, divide down such positive voltage at the gate electrode of the transistor 300Q5; this inhibits transmission from the source electrode to the drain electrode; the source electrode receives the EKG signals. When at the end of the 5 second interval pin 11 of unit 200Z3A once more goes "down", the potential of the gate electrode of the transistor 300Q5 is made sufficiently negative to permit passage of the EKG signals through the transistor 300Q5 and via terminal and line CF1 to the modulator unit 600 (FIG. 2F).

Considering next the Modulator and Speaker Driver 600 (FIG. 2F), the frequency modulator comprises the transistors Q8, Q9, Q10 and Q11, and the depicted circuitry associated with them. These transistors function as a free-running multivibrator whose frequency, however, is dependent on the level of the input voltage at the bases of the transistors Q8 and Q9, this input voltage being applied via line CF1 from the terminal Y in the block 300. The frequency modulator thus is of the kind commonly known as a "Voltage-Controlled Oscillator" (VCO). The primary frequency-determinative components are the resistors R37 and R38, and the capacitors C9 and C10. The emitter circuits of the transistors Q8 and Q9 include, in common to both, an adjustable potentiometer R53, which is pre-set at the factory so as to cause oscillation at the nominal center frequency of 1800 Hz. Adjustment of the potentiometer R53 will also affect the deviation sensitivity of the modulator, and if it is desired, the potentiometer R53 may be used to adjust deviation sensitivity. It is the presently preferred practice to adjust the potentiometer R53 to that position which in the initial factory alignment results in the exact center frequency of 1800 Hz, and leave it undisturbed at that setting thereafter. The fact that the center frequency thereafter may drift during operation is of no moment, since the equipment at the diagnostic central is not sensitive to direct-current changes. The advantage of adjustment of the potentiometer R53 for correct center frequency, initially at least, is that one begins with the maximum margin for future drift in either direction. Excessive drift of the center frequency is undesirable because of possible interference in the telephone lines, and further because the modulator's deviation response becomes too nonlinear. More will be said about excessive deviation from center frequency in connection with the description of the Deviation Limiter 500 (FIG. 2E).

On the other hand, aligning the potentiometer R53 (FIG. 2F) for initially correct center frequency leaves the modulator's deviation sensitivity to the tolerance margin of the components. Experience has shown, however, that with the tolerances of the components as illustrated in "FIG. 2", the deviation sensitivity will be within the 10 percent design tolerances, i.e. will be 202 Hz to 248 Hz per volt input, and hence the pen deflection at the diagnostic central may vary from the nominal 1cm by ± 1 mm.

If it is desired to control the deviation sensitivity to closer tolerances, the following possibilities exist:

1. Utilize the potentiometer R53 as a deviation sensitivity control. This would leave the center frequency out of control, even initially, and might be disadvantageous for this reason. Furthermore, bearing in mind the location of the potentiometer R53 in the modulator circuit, the potentiometer R53 is not a particularly sensitive device for deviation sensitivity adjustment purposes.
2. Tighten the tolerances on the following components to 2 percent; capacitors 600C9 and 600C10 (FIG. 2F); Zener diode 200CR7 (FIG. 2B); clamping diode 300CR6 (FIG. 2C).
3. Insert between the terminals X and Y of FIG. 2C, the resistor combination indicated in FIG. 3, in lieu of the resistor 300R20 of FIG. 2C. This is perhaps the best of the proposed three alternatives, since it affords independent adjustment of both the center frequency and the deviation sensitivity. The potentiometer 600R53 (FIG. 2F) would be adjusted for exact initial center frequency of 1800 Hz at 0 volts input, and the potentiometer R20A in FIG. 3 would be adjusted for exactly 1 cm deflection at the diagnostic central, with the Calibrate Generator 300 (FIG. 2C) in running condition. Using this third alternative, the observer at the diagnostic central would see uniformly 1 cm deflection for all patients for so long as the deviation sensitivity of a given transmitter remained constant. In the event of reduction in the deviation sensitivity, the observer could use the reduction as a correction factor to be applied to the amplitudes of the EKG signals themselves.

Incidentally, the swing at the bases of the transistors Q8 and Q9 (FIG. 2F) is positive-going from 0 volts for the calibration signals, and also for the EKG signals, assuming Mode I operation. Such positive-going signal voltage results in negative-going frequency deviation of the voltage control oscillator. Whether the electrocardiogram plotted at the central is then "reconstructed" to produce positive-going swings, as illustrated in FIG. 4, depends upon the sign of the pen deflection vs. input frequency discriminator characteristic of the diagnostic central.

The output of the modulator (FIG. 2F) is coupled via resistor 600R40 to the input of an integrated circuit packaged power amplifier 600Z2, which in the working embodiment of the invention is Motorola Corporation type MC1306P. The power amplifier Z2 drives the loudspeaker 600SP through the coupling capacitor C12.

Considering next the EKG-Amplifier 400 (FIG. 2D) in Mode I, the left-arm input signal LA (FIG. 2A) is coupled, by the contacts of push-button I in the "in" position, via resistor 100R56 and line AD1 to the gate electrode of field effect transistor 400Q1A (FIG. 2D), and the right-arm input signal RA (FIG. 2A) is coupled, via the contacts of push-button III in the "out" position, and via resistor 100R43 and line AD2 to the gate electrode of field effect transistor 400Q1B (FIG. 2D), which forms with the transistor Q1A a closely matched pair. The transistors Q1A and Q1B function as a differential amplifier, with high common mode rejection; that is, self-cancellation of in-phase noise signals. In the source electrode circuit for both transistors, there is provided a diode 400CR4 which in operation closely approximates a constant current source with high impedance; as such, the diode is effective for common mode rejection. The capacitors 400C1 and 400C15 contribute to roll-off the frequency response of the Amplifier 400 together with other high-frequency roll-off components found in subsequent stages. The Amplifier 400 is designed to have a frequency response which is down 3 decibels at 0.25 Hz and 80 Hz. A second differential amplifier stage is provided by the transistors 400Q2 and 400Q3, and associated circuitry. The constant current source for these latter transistors is provided by the transistor 400Q4 and its associated circuitry. The capacitor 400C13, in association with the resistor 400R42 serves in part to contribute to high frequency roll-off, and in part as a power-supply decoupling network. The combined "mid-frequency" (about 50 Hz) gain of the two differential amplifier stages is about 17 considered from the left-arm electrode to the right-arm electrode on the one hand, to the collector of the transistor 400Q2. The remainder of the amplifier is single-ended, rather than double-ended (differential).

The next two stages of the Amplifier 400 include the two sections of a dual operational amplifier 400Z1, the two sections being designated as Z1A and Z1B. The dual unit Z1 is a packaged integrated circuit unit, manufactured by the Signetics Corporation, their type designation M5558V. As is well known from operational amplifier theory, the closed-loop gain G of an operational amplifier having high open-loop gain and heavy degenerative feedback, is given by (1)

$$G = 1 + \frac{\text{Impedance in Feedback Path from Amplifier Output Terminal to Amplifier Input Terminal}}{\text{Impedance Connected from Amplifier Input Terminal to Ground}}$$

The expression which appears in the denominator on the right-hand side of Equation (1) should not be confused with the effective input impedance of the operational amplifier, which is usually much higher than the term given in that denominator.

For the immediately following discussion of mid-frequency gain of the operational amplifier Z1A and Z1B, it is assumed that the capacitors 400C2 and 400C3 are virtual short circuits at mid-frequency, and the capacitor 400C1 is virtually an open circuit. With this in mind, application of Equation (1) to the amplifier stage Z1A results in $$(2)\ G = 1 + (R55 + R16)/R15$$

The rheostat-connected potentiometer 400R55 (gain control) is field-adjusted to the patient so as to produce a +2 volt swing at the input to the modulator (the bases of transistors 600Q8 and 600Q9; FIG. 2F), whether the patient's input signal at the electrodes amounted to as little as 0.5 millivolts peak or as much as 5 millivolts peak. The initial adjustment of potentiometer R55 is made by means of a screwdriver to adjust the potentiometer R55 to that setting which will result in 2 cm pen deflection. The potentiometer setting is thereafter locked in place, and record is made at the central of the dial setting.

It is evident, that the impedance in the feedback path for the amplifier stage Z1A (FIG. 2D) for the condition of minimum gain/maximum feedback, applicable to the patient producing 5 millivolts input, is 39 K-ohms since the gain as obtained from Equation (2) works out to be forty.

The output of the amplifier 400Z1A is attenuated at the input pin 5 of amplifier stage Z1B, by the voltage division of resistors R57 and R17, by a factor of 5/6. Application of Equation (1) to the amplifier stage Z1B results in a mid-frequency gain for the latter amplifier of eleven. It will be recalled, that at the end of the 5 second calibration signal, the field effect transistor 300Q5 is placed in a condition permitting conduction from its source electrode to its drain electrode, and this inter-electrode path is essentially a short circuit. Therefore, the output of the amplifier stage Z1B as coupled to the input of the modulator is attenuated by the voltage division of the resistors 400R24 and 300R21 to ⅔.

Considering together all the gain and attenuation factors from the input electrodes to the input of the modulator, one obtains for the patient producing 0.5 millivolt input at the electrodes (3) $0.5 \text{ mv} \times 17 \times 40 \times 5/6 \times 11 \times 2/3 = 2 \text{ volts}$ and for a patient producing 5 millivolt input, one obtains (4) $5 \text{ mv} \times 17 \times 4 \times 5/6 \times 11 \times 2/3 = 2 \text{ volts}$ The exact values on the right-hand side of Equations (3) AND (4) are unimportant; what matters is the setting of the potentiometer R55 necessary to produce 2 cm pen deflection at the diagnostic central.

As illustrated, the resistor R58 is fixed, and as such serves to establish proper bias potential at pin 2 of the amplifier Z1A, proper for whatever may be the setting of potentiometer R55. With resistor R58 fixed as shown, the Equations (3) and (4) still hold.

In an alternative embodiment the resistor R55 is replaced either by a potentiometer or by three fixed resistors and a 3-position switch, in a circuit which permits setting the gain of Amplifier 400 at normal, half and full gain. Such a replacing potentiometer is indexed to half, double and normal gain, which three positions has been found, in practice, to produce a proper pen deflection at the central for nearly all patients.

In addition to the capacitors 400C1, C15 and C13, the capacitor 400C4 also contributes to the high-frequency roll-off; at higher and higher frequencies, the capacitor C4 virtually short-circuits the input and output of operational amplifier Z1B whence the gain of unit Z1B, consistent with Equation (1), is reduced to unity (1).

Contributing to the low-frequency roll-off is capacitor 200C2, which is connected in the circuit of pin 2 of unit Z1A, and capacitor 400C3, which is connected in the coupling circuit between the units Z1A and Z1B. Considered in the context of Equation (1), it is clear that at low frequencies the denominator on the right-hand side of Equation (1) tends to become infinite, so that the low-frequency gain of the stage Z1A is reduced to unity (1).

Shunted across the feedback path of the stage Z1A are two series-connected diodes CR1 and CR2 which become active only if the voltage difference between output pin 1 of the stage Z1A and its input pin 2 exceeds twice the forward voltage drop of either diode of 0.6 volts, or altogether 1.2 volts. Such 1.2 volt differential might occur under transient conditions; for example, in the case of switching of push-buttons I, II. . . etc. while transmission is in progress —more on this point at the Appendix —or in the transition from calibration signals to EKG-signals illustrated in FIG 4, or upon incidence of pacemaker "spikes" in the EKG-signal. The pacemaker spikes are of considerably greater amplitude than the EKG-signals proper, as is explained in the Aurbach application cross-referenced at the beginning of the present specification. Each of the capacitors C2 and C3 has a value of 47 microfarads. Noting the values of the various resistors on the input side, the output side, and in the feedback path of the stage Z1A, it is clear that we deal here with relatively long time constants. The diodes CR1 and CR2 function to provide low impedance charging paths for the capacitors under conditions of large signal amplitudes, and thereby aid in more quickly establishing steady-state conditions. In terms of the wave form in FIG. 4, it might be said that steady-state conditions exist beginning with the fifth QRS complex. The diodes 400CR1 and CR2 further serve to act as a virtual short-circuit for very large signal amplitudes. The gain of amplifier Z1A for such very large signal amplitudes is in essence reduced to unity (1), noting Equation (1). This avoids the undesirable condition of overloading of the amplifier, and overloading it for a prolonged period, again having regard to the long time constant. If the diodes CR1 and CR2 were not present, overloading of the amplifier might be prolonged for possibly the full transmission period, so that the transmission might have to be unnecessarily repeated.

In the foregoing sense, diodes CR1 and CR2 serve as "transient eliminators" or "transient reducers". A transient elimination function is performed also by the oppositely-poled diodes CR3 and CR9 which shunt the resistor R17, these three devices being connected between input pin 5 of the stage Z1B and ground. While the transient elimination purpose for diodes CR3 and CR9 is similar to that of diodes CR1 and CR2, rather than providing paths for rapid charging, the diodes CR3 and CR9 are provided to prevent overly rapid discharge of the capacitor C3.

The Deviation Limiter 500 (FIG. 2E) is provided with complementary transistors Q12 and Q13, and the illustrated symmetrical circuitry. The together-connected emitters of these transistors are connected to the output of the Amplifier 400 via lines CE1 and CD1, or, depending upon one's point of view, the output of the amplifier 400 via line CD1, and also the output of the Deviation Limiter 500 via line CE1, are both connected to the source electrode of the transistor 300Q5 (FIG. 2C). The transistors Q12 and Q13 (FIG. 2E) function to clamp the output of Amplifier 400 (FIG. 2D) to a maximum voltage swing, as measured at the bases of the modulator transistors 600Q8 and 600Q9 (FIG. 2F), of about ± 3 volts, equivalent to frequency deviation of ± 700 Hz. This is desirable to prevent possible interference in neighboring telephone circuits, and also for the purpose of avoiding overloading the system at the diagnostic central.

APPENDIX

For the purpose of transmitting a full five-electrode electrocardiogram, it is necessary to connect also the right-leg, the left-leg and the chest electrodes. The Switching Unit 100 (FIG. 2A) includes a standard telephone jack J1 into which is insertable a complementary mating telephone plug with the following connections: pin of the plug to the left-leg electrode; middle sleeve to the chest electrode; inner (grounded) sleeve to the right-leg electrode and to the shielding sheaths. The respective mating contacts of the telephone jack J1 are designated as LL, CH, RL (grounded). The following Table I summarizes the circuit conditions in the various Electrode Modes or Switching Modes, or (in more standard electrocardiography parlance) "Lead Configurations". In Table I, for a given Mode only the active electrodes are listed; for example, in Mode I the inactive electrodes LL and CH are not mentioned.

TABLE I

| Mode (Push-Button) | Electrode | Connected via | To | Input Impedance (Lowest) — Comments |
|---|---|---|---|---|
| I | LA | R56 (10K) | Q1A | Between LA and RA: Essentially R1 + R2 = 44 M (Megohms) |
| | RA | R43 (10K) | Q1B | Comment: LA relative to RA has a positive R-peak in the QRS-complex |
| II | RA | R43 (10) | Q1B | Between LL and RA : Essentially R1 + R2 = 44 M |
| | LL | R56 (11K) | Q1A | |
| III | LA | R45 (10K) | Q1B | Between LA and LL : Essentially R1 + R2 = 44 M |
| | LL | R56 (10K) | Q1A | |
| AVR | LA | R45 (10K) | Q1B | Between LA and LL : R45 + R46 = 20,000 |
| | LL | R46 (10K) | Q1B | Comment: Sign reversal for LA to RA |
| | RA | R44 (5.1 K) | Q1A | voltage, relative to I; in AVR, LA relative to RA has a negative R-peak in the QRS-complex |
| AVL | LA | R44 (5.1 K) | Q1A | Between RA and LL : R43 + R46 = 20,000 |
| | RA | R43 (10 K) | Q1B | |
| | LL | R46 (10 K) | Q1B | |
| AVF | LA | R45 (10K) | Q1B | Between LA and RA : R45 + R43 = 20,000 |
| | RA | R43 (10K) | Q1B | |
| | LL | R44 (5.1 K) | Q1A | |
| V | LA | R45 (10K) | Q1B | Between LA and RA : R45 + R43 = 20,000 |
| | RA | R43 (10K) | Q1B | Between LA and LL : R45 + R46 = 20,000 |
| | LL | R46 (10K) | Q1B | Between RA and LL : R43 + R46 = 20,000 |
| | CH | R47 (3.3K) | Q1A | |

Inspection of the last column of Table I indicates that for Modes I, II, III, the input impedance presented to the electrodes is essentially 44 Megohms, but for the remaining Modes, the input impedance seen between certain electrode pairs drops to 20,000 ohms. Such low input impedance may present appreciable loading effect, especially if the patient has relatively high skin resistance. But this is the design now accepted as standardized in the electrocardiography technology. Any attempt in the present invention to eliminate loading effects might lead to serious misinterpretations by the cardiologist, who has been conditioned to make allowance, and mental allowance at that, for loading effects in Modes AVR et seq. Therefore, the calibration signals are valid on a 1:1 basis) (strictly speaking a (1:2 basis) in relation to the EKG signals, only in the Modes I, II, III.

Mindful of the more restricted significance of the calibration signals in Modes other than the first three, the transmitter of the present invention may be utilized to provide a complete series of EKGs. Several Modes may be sent successively in a single transmission; or they may be sent separately in successive transmissions. The switching of push-buttons during the course of a single transmission is apt to produce transients; these, however, are eliminated, or at least minimized by the action of the diodes 400CR1, 400CR2, 400CR3, 400CR9 (FIG. 2D).

What is claimed is:

1. Apparatus for use in transmission of electrocardiographic (EKG) signals derived from a patient, transmission being from the patient's location via a common carrier transmission means to a central location, the apparatus being normally in an inactive state, comprising an amplifier for amplifying the patient-derived EKG signals; reference signal generating means for generating a reference signal of predetermined amplitude; a frequency modulator operating at a carrier frequency within the audio range for frequency-modulating the carrrier with input signals to the modulator; a patient-operable switch momentarily operable for activating the apparatus; automatically timed switching means responsive to the momentary operation of the patient-operable switch for switching in as input signals to the modulator, the amplified EKG signals such that the amplified EKG signals and the reference signal are timewise juxtaposed; means for coupling the resultant frequency-modulated signal to the common carrier transmission means; a shut-off timing signal generator responsive to patient-operable switch for producing a shut-off timing signal having a given duration; and means responsive to the termination of the shut-off timing signal for automatically shutting off the apparatus to return it to the inactive state.

2. Apparatus as claimed in claim 1, wherein the reference signal generating means comprises means for generating a train of pulses of predetermined amplitude.

3. Apparatus as claimed in claim 2, wherein the reference signal generating means is a square wave generator.

4. Apparatus as claimed in claim 1, wherein the automatically timed switching means first switches-in to the input of the frequency-modulator solely the reference signal, and after the termination of the reference signal switches-in to the input of the frequency-modulator the amplified EKG signals.

5. Apparatus as claimed in claim 4, wherein the common carrier transmission means comprises a telephone set located at the patient's location, and wherein the coupling means includes a loudspeaker driven by the frequency-modulator and acoustically coupled to the mouthpiece of the patient's telephone set.

6. Apparatus as claimed in claim 1, further comprising a battery-type power supply source to which the apparatus proper in its inactive state presents essentially neglibible loading effect, a normally likewise inactive voltage regulator for the apparatus, circuit-connecting means activated by the patient-operable switch for actively connecting the voltage regulator to the power supply source, thereby to activate the voltage regulator and to cause application of regulated voltages to the apparatus proper to place the apparatus proper into its active state, a reference signal timing means responsive to operation of the patient-operable switch to generate a reference signal timing signal of a given duration, the reference signal generating means being responsive to initiation and to termination of the reference signal timing signal to generate the reference signal solely while the reference signal timing signal persists, said automatically timed switching means also being responsive to, an during persistence of, the reference signal to feed to the input of the frequency-modulator solely the reference signal, and responsive to termination of the reference signal to feed to the input of the frequency-modulator the amplified EKG signals, the circuit-connecting means being responsive to termination of the shut-off timing signal to break the power supply-to-voltage regulator connection, thereby to render once more inactive the apparatus proper.

7. Apparatus as claimed in claim 6, wherein voltage to the reference signal timing means is supplied directly by the power supply source upon operation of the patient-operable switch.

8. Apparatus as claimed in claim 6, wherein power to the circuit-connecting means is supplied directly by the power supply source upon operation of the patient-operable switch.

9. Apparatus as claimed in claim 9, wherein voltage to the circuit-connecting means is supplied as a regulated voiltage from the voltage regulator.

10. Apparatus as claimed in claim 1, further comprising a clamping circuit connected to the input of the frequency modulator for clamping such input signals to the frequency modulator, as would otherwise be of excessive amplitudes, to fixed maximum amplitudes.

11. Apparatus as claimed in claim 10, wherein the clamping circuit is arranged to clamp the otherwise excessive amplitude input signals to both positive and negative fixed maximum amplitudes.

12. Apparatus as claimed in claim 1, wherein there is provided, preceding the amplifier, a patient-operable switching unit for switching in to the amplifier patient-derived electrocardiography signals which correspond to the desired one of the plurality of standard electrocardiography electrode-connection-modes.

13. Apparatus as claimed in claim 1, wherein the amplifier comprises plural stages, and wherein in at least one stage there is provided a diode-shunting circuit effective to alter a time-constant of such stage for excessive amplitudes of signals passing through such stage, whereby to suppress undesired transient signals.

* * * * *